United States Patent
Cutler et al.

(10) Patent No.: US 7,529,478 B2
(45) Date of Patent: May 5, 2009

(54) ADAPTIVE ILLUMINATION LIGHTING SYSTEM

(75) Inventors: Shaun Cutler, Morpeth (GB); Tony Whiting, North Shields (GB); David Lambert, Newcastle Upon Tyne (GB)

(73) Assignee: Raytec Limited, Ashington (GB)

( * ) Notice: Subject to any disclaimer, the term of this patent is extended or adjusted under 35 U.S.C. 154(b) by 0 days.

(21) Appl. No.: 11/729,979

(22) Filed: Mar. 30, 2007

(65) Prior Publication Data

US 2007/0242939 A1    Oct. 18, 2007

(30) Foreign Application Priority Data

Mar. 30, 2006    (GB) ................ 0606371.3

(51) Int. Cl.
    *G03B 15/02*    (2006.01)
(52) U.S. Cl. .................... 396/62; 396/175; 362/18
(58) Field of Classification Search ......... 362/250,
    362/237–239, 285, 287, 3, 7, 8, 11, 13, 14,
    362/18, 388, 418, 427–428, 450, 228; 396/62,
    396/175
    See application file for complete search history.

(56) References Cited

U.S. PATENT DOCUMENTS

| 3,374,342 | A | * | 3/1968 | Hutchins | ............... 362/8 |
| 4,101,259 | A | * | 7/1978 | Shaffer et al. | ............... 431/359 |
| 4,707,766 | A | * | 11/1987 | Bertozzi et al. | ............... 362/11 |
| 5,580,163 | A | * | 12/1996 | Johnson, II | ............... 362/285 |
| 5,658,069 | A | | 8/1997 | Alonzo, Jr. et al. | |
| 5,734,934 | A | * | 3/1998 | Horinishi et al. | ............... 396/62 |
| 5,772,302 | A | * | 6/1998 | Ishikawa et al. | ............... 362/3 |
| 5,911,085 | A | * | 6/1999 | Fuke et al. | ............... 396/62 |
| 6,450,668 | B1 | * | 9/2002 | Kotloff | ............... 362/269 |
| 2005/0099810 | A1 | * | 5/2005 | Tasson et al. | ............... 362/250 |

FOREIGN PATENT DOCUMENTS

| DE | 20007687 | 2/2001 |
| GB | 548302 | 10/1942 |
| GB | 2373569 | 9/2002 |
| JP | 10144133 | 5/1998 |
| WO | WO 2006-060905 | 6/2006 |

OTHER PUBLICATIONS

UK Search Report of Application No. GB0606371.3 Mailed Aug. 28, 2007.

* cited by examiner

*Primary Examiner*—John A Ward
(74) *Attorney, Agent, or Firm*—Pearl Cohen Zedek Latzer, LLP

(57) ABSTRACT

An adaptive illumination device comprising first and second lighting units connected to each other by way of a hinge mechanism, and further provided with a gear mechanism such that angular movement of the first lighting unit about the hinge causes equivalent angular movement of the second lighting unit in an opposite direction about the hinge.

4 Claims, 5 Drawing Sheets

ADAPTIVE ILLUMINATION LIGHTING SYSTEM

RELATED APPLICATION DATA

The present application claims priority from prior UK Patent Application No 0606371.3 filed Mar. 30, 2006, incorporated by reference herein in its entirety.

FIELD OF THE INVENTION

This invention relates to an illumination system that provides adaptable illumination (AI) lighting to work in conjunction with CCTV cameras, notably (but not exclusively) with Vari-Focal lenses. More specifically, certain embodiments of the invention refer to a solid-state LED illumination product that provides adaptable illumination across the horizontal landscape.

BACKGROUND

Few will suggest that CCTV is not a valuable tool in the fight against crime, but many surveillance systems are failing to provide useful picture because of poor lighting solutions. Existing lighting solutions struggle to provide the flexibility and critically the flexible illumination requirements that the CCTV camera and lens require.

Many CCTV systems are installed using vari focal lenses where the target scene of the camera/lens combination can be adjusted on scene to match the particular security requirements During the day ambient sunlight provides sufficient illumination to provide high quality even illumination CCTV images. However during the more vulnerable hours of darkness these cameras fail to provide high quality CCTV without adequate illumination.

Traditional illuminators have a fixed beam angle which can not be altered to match the view of the camera

SUMMARY

Embodiments of the invention provide the required illumination provided by either infra-red or white-light LED sources and allow the beam pattern to be matched to the scene requirements.

According to some embodiments of the present invention, there is provided an adaptive illumination device comprising first and second lighting units connected to each other by way of a hinge mechanism, and further provided with a gear mechanism such that angular movement of the first lighting unit about the hinge causes equivalent angular movement of the second lighting unit in an opposite direction about the hinge.

The angle of illumination can be adjusted to provide a wider or narrow angle of illumination over a chosen area to match with field of view of the CCTV lens/camera. The system is designed primarily (but not exclusively) for surveillance purposes.

In preferred embodiments, each lighting unit comprises a housing with a panel or matrix of light emitters provided on a frontal surface thereof. The light emitters may be LEDs, and may emit visible or infra-red or other light.

The gear mechanism may be provided with a servo motor or the like such that the two units may be caused to pivot about the hinge under electronic control. The electronic control may be linked with a zoom control for a lens of an associated video camera, such that the two units pivot away from each other as the focal length of the lens is reduced (for wide-angle operation), or pivot towards each other as the focal length of the lens is increased (for telephoto operation).

The primary function of the invention is to provide an adjustable and flexible beam pattern from a single illuminator, to be used in conjunction with CCTV camera and lens.

Raytec Adaptive Illumination™ is uniquely designed to enable the field of view of the illuminator to match the field of view of the lens.

Conventional light sources provide a fixed angle of illumination This means that when installed with CCTV cameras the light does not always match the angle of view of the vari-focal lens. Some embodiments of the invention allow for the light source angle to be adapted in accordance with the chosen scene.

The secondary function is to provide a more even horizontal beam pattern for use with CCTV cameras than the conventional single body illuminators. Conventional light sources suffer from a rapidly decreasing intensity of light across the scene. This results in either under or over exposed image as object or individuals move across the scene. Embodiments of the adaptive illumination invention provide a flexible beam pattern by combining mechanical components to control the light output of the illumination system specifically designed for camera based vision systems. The flexible design/adaptive illumination feature helps provide a more even and useable illumination. The result may be a significantly improved, more even illumination pattern.

An embodiment of the system may include two elements which enable the installer to correctly install the lamps and match the field of view of the lens.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

DETAILED DESCRIPTION

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well known features may be omitted or simplified in order not to obscure embodiments of the invention described herein.

Figure 1:
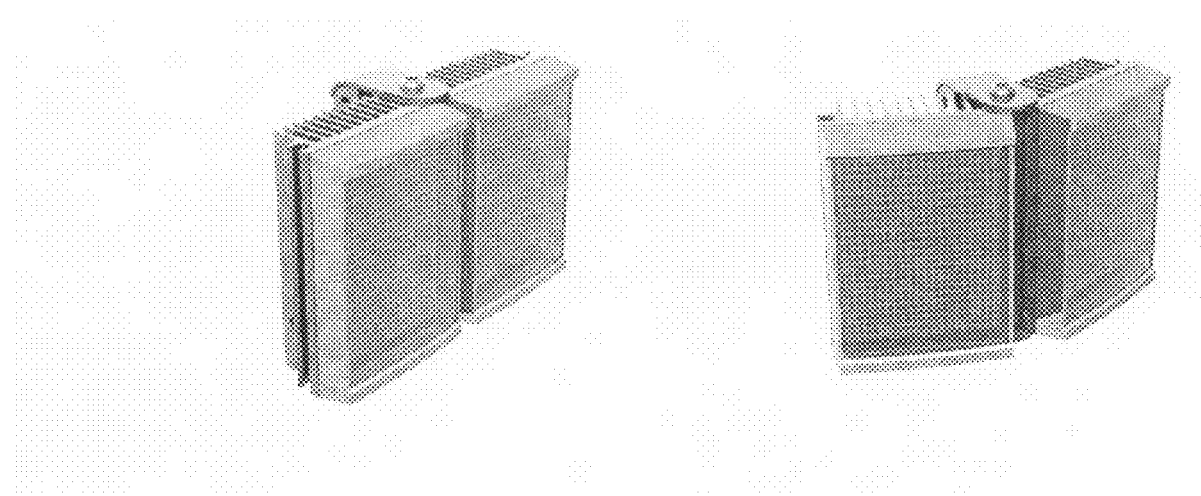
FIGS. 1A and 1B shows a preferred embodiment of the present invention.

The adaptive illumination concept uniquely provides mechanical controls as shown in FIG. 1, an embodiment of the invention Mechanical control is achieved by dividing lighting unit 100 into two separate halves, 101 and 102, which can be moved in conjunction with each other in a horizontal plane—thereby providing mechanical control over the horizontal beam distribution. A series of cogs/pivots 103 will ensure that the two units can be smoothly and easily adjusted together with markers showing the angle of displacement from each other (below). Also, the mechanical design of the adaptive illumination concept means that several units can be joined together—all with independent horizontal control.

FIG. 1 illustrates the mechanical aspects of the adaptable illumination feature allowing angles to be altered. The solution is primarily a cogged mechanical solution that allows the user to select a beam pattern in accordance with the scene. The cogs below highlight a small arrow that indicates the selected beam pattern. The cogs and arrow can be used by the installer to ensure that the angle of illumination matches the field of view of the lens. This is particularly useful when using infra-red since the illumination can not be seen by the human eye.

Figure 2:
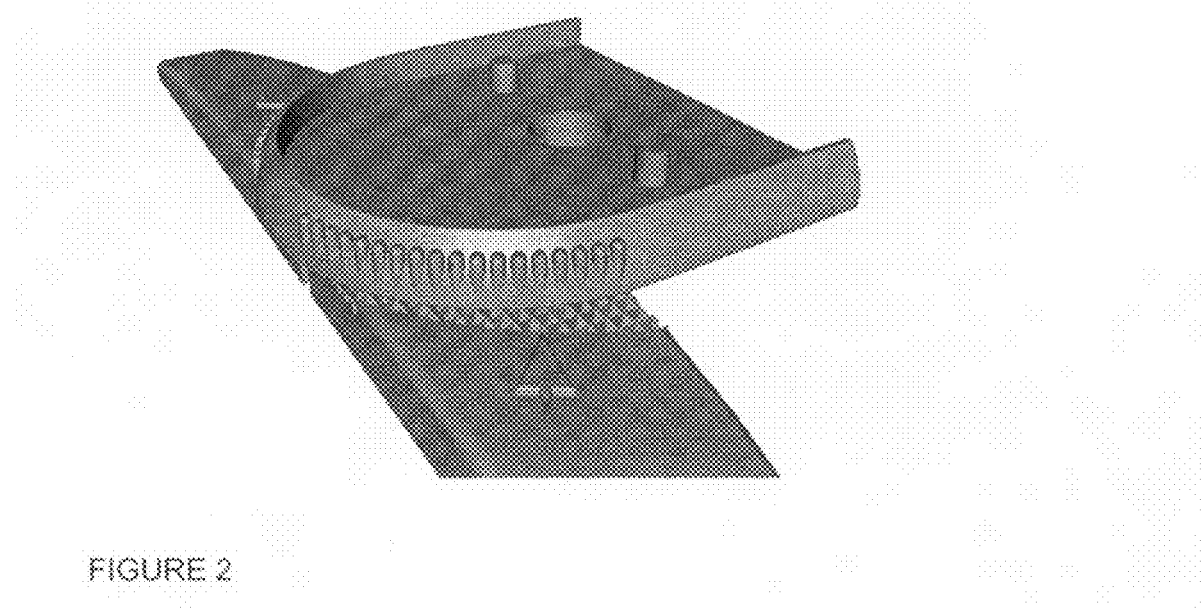
FIGS. 2 and 3 show a cog and bracket mechanism of the embodiment of FIG. 1.
Figure 3:
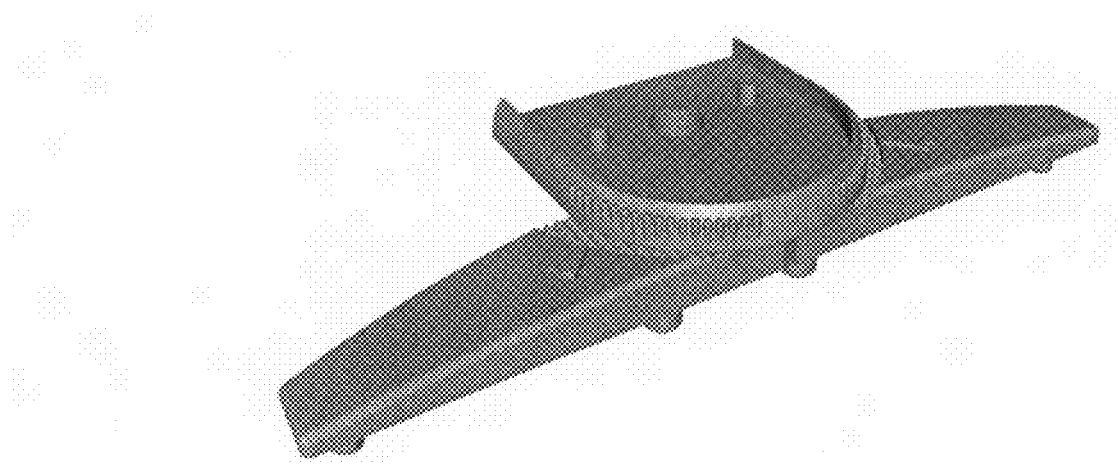

A bracket and cog system 200 is shown in FIGS. 2 and 3, and comprises a uniquely designed set of cogs 201 and bracketry 202 with indicators 203 which show the angle of light emitted from the lamp. This is particularly useful when setting up Infra Red systems with cameras—since the Infra Red is not visible during the day when most installations are undertaken. The cogs and indicators are specifically calibrated for the needs of the CCTV installer and are designed to be compatible with, and provide coverage for, available varifocal lenses.

Figure 4:
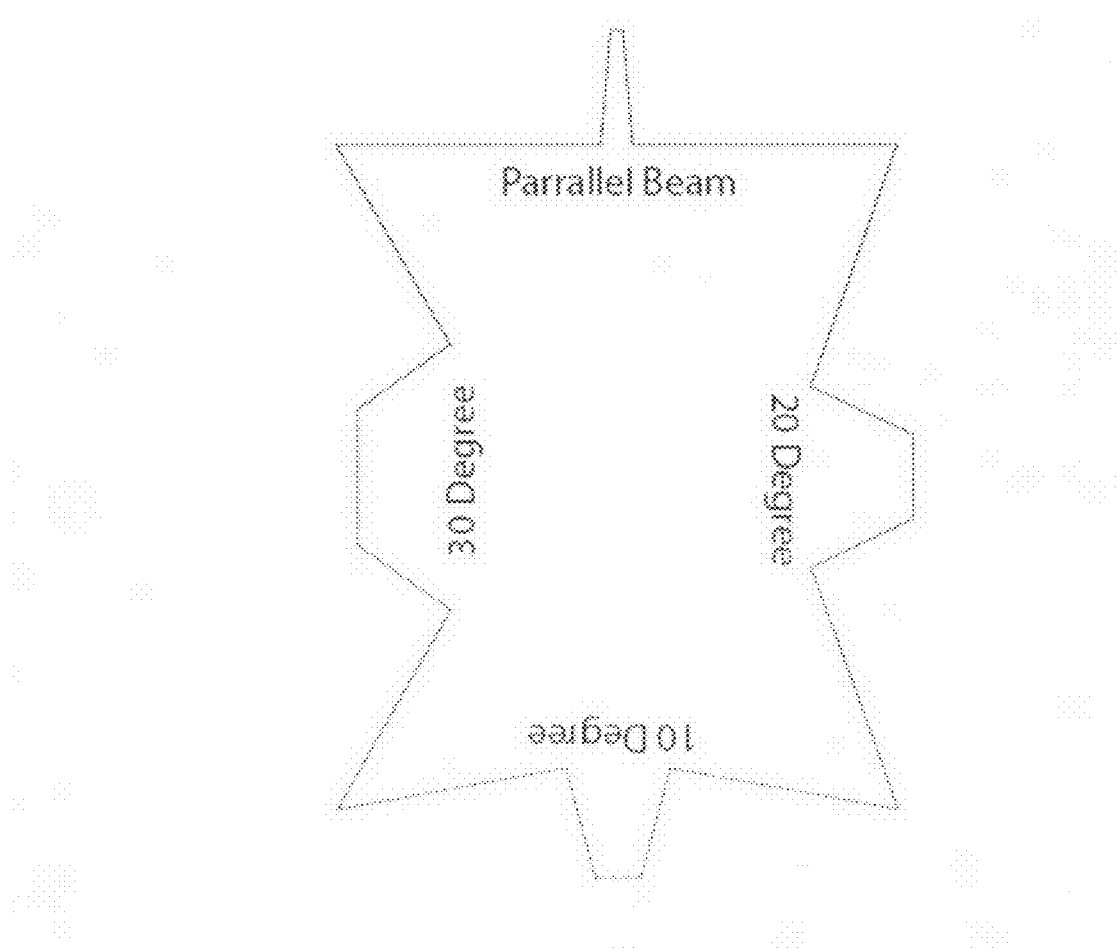
FIG. 4 shows a key for use with the embodiment of FIG. 1.

In addition to the bracket and cog system 200 of FIGS. 2 and 3, there may be provided an adaptive illumination key (FIG. 4, 400) which enables the installer to check and/or set the beam angle by inserting the key between cogs 201. Again, this is invaluable for setting up Infra Red systems during the day since the Infra Red illumination is not visible to the human eye.

Figure 5:
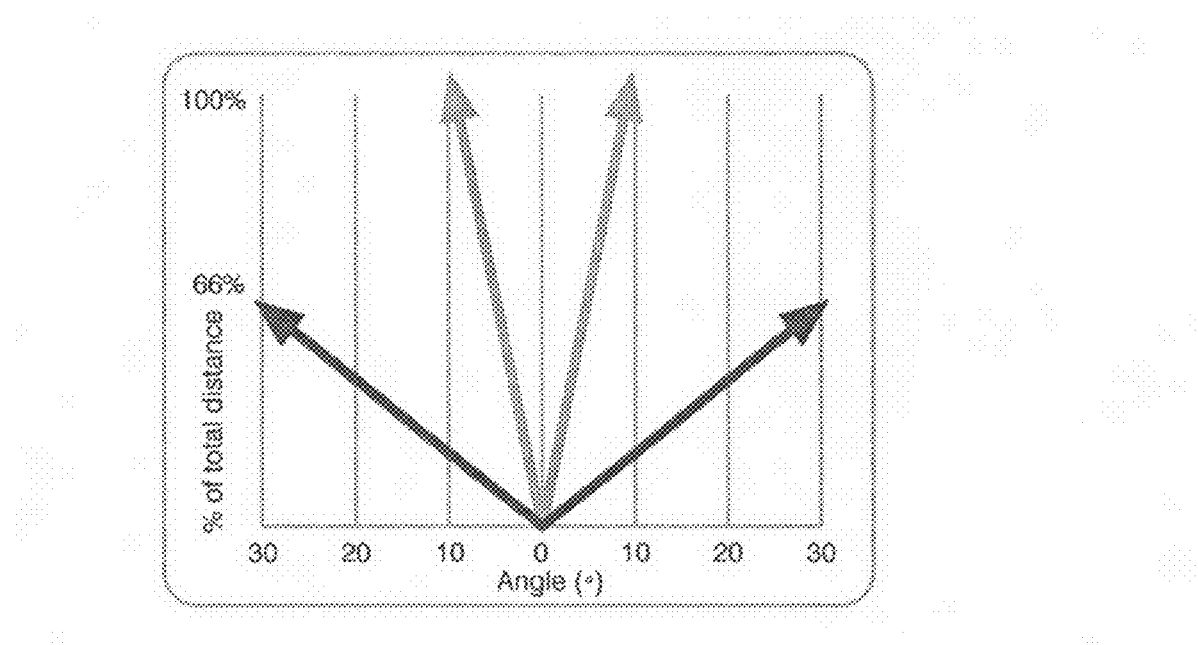
FIG. 5 shows, in schematic form, a range of illumination angles.

FIG. 5 illustrates the flexibility provided by the adaptive illumination feature. The example shown here demonstrates the possible illumination patterns from a 20-60 degree adaptive illumination product.

Figure 6:
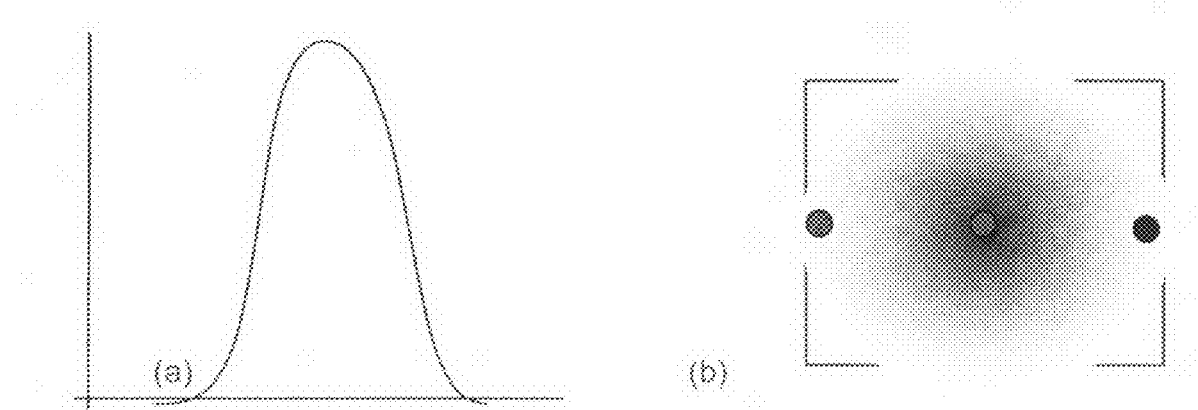
FIGS. 6(a) and 6(b) respectively show an intensity curve of a prior art illuminator and a corresponding image on a CCTV monitor showing a scene illuminated by the prior art illuminator.

With reference to FIGS. 6(a) and 6(b), illumination from a traditional lighting system produces a fixed beam pattern that often results in a single intensified fixed spot.

Figure 7:
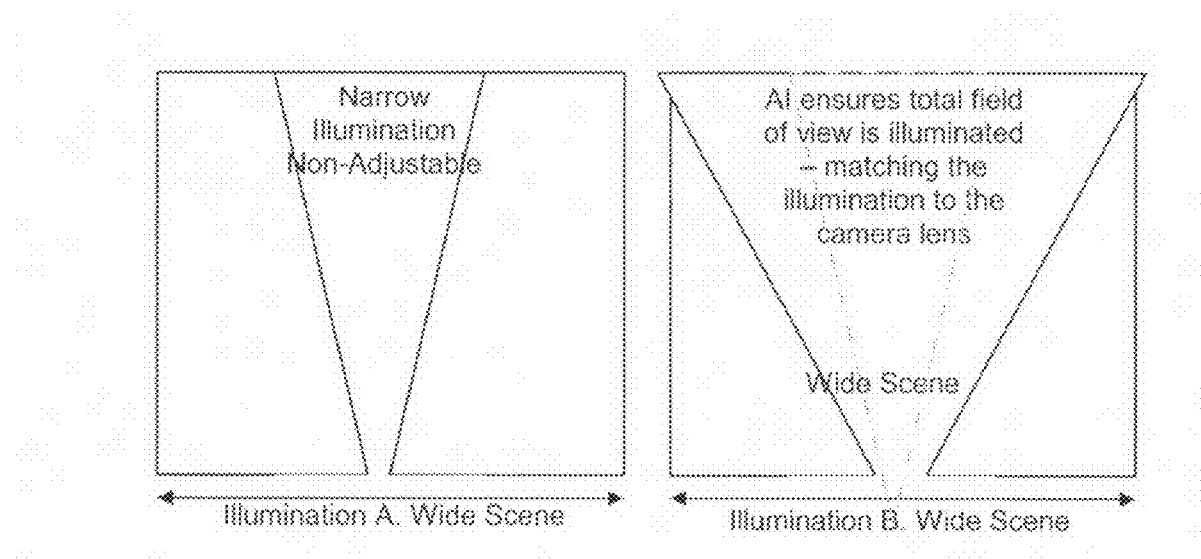
FIGS. 7(a) and 7(b) show a comparison of a scene illuminated by a prior art illuminator and an illuminator of an embodiment of the present invention.

FIG. 6(a) shows the output from a traditional illuminator, with a single beam having a high central peak intensity of light FIG. 6(b) is a representation of the output shown in FIG. 6(a) when projected onto a scene and the scene viewed on a CCTV monitor The illumination does not cover the whole scene, with the middle subject being over illuminated and outside subjects being under illuminated or not illuminated at all. In FIG. 6(b), the representation is polarised to demonstrate intensity in the centre of the CCTV monitor with a 4×3 aspect ratio. The effect can create a vignette leaving the outside corners dark (non-polarised) and the centre point over illuminated With reference to FIG. 7(a), this shows a scene illuminated by a known fixed beam illuminator which cannot adjust to accommodate a wider field of view. FIG. 7(b) shows an embodiment that has been set to illuminate a wide scene by moving the lighting units about the hinge so as to illuminate a wider field of view. Additionally a fixed narrow beam will cause glare and white out on a wide scene, conversely a fixed wide beam on a narrow scene results in wastage and unnecessary light pollution (visible illumination only). The flexibility of embodiments of the present invention allows the beam to adjust to the scene reducing glare and white out whilst ensuring that no light is wasted or creating unnecessary light pollution FIGS. 8(a) and 8(b) may be compared with FIGS. 6(a) and 6(b), and show an application of an embodiment of the invention.

Figure 8:
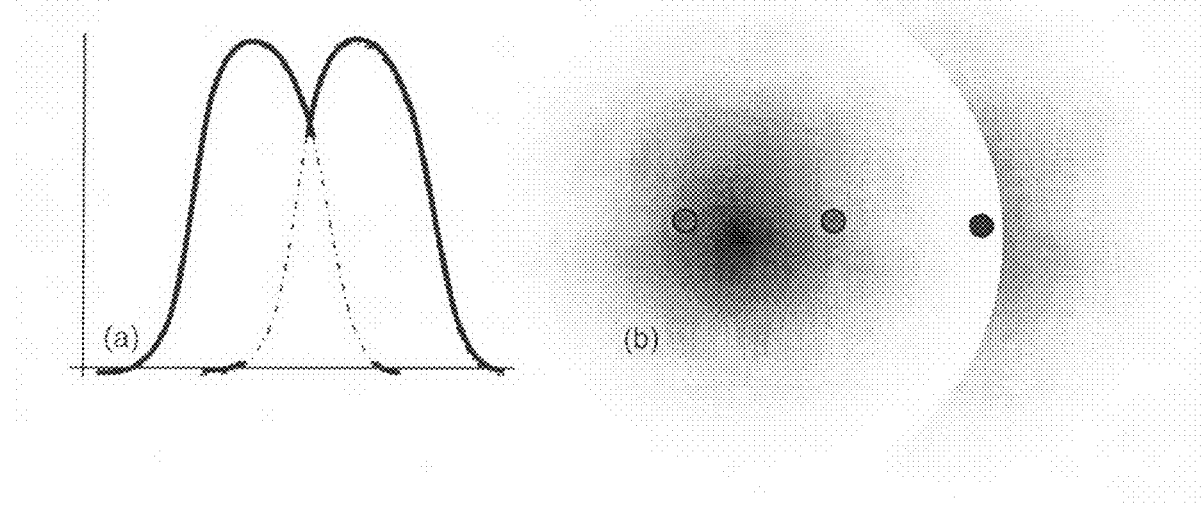
FIGS. 8(a) and 8(b) respectively show an intensity curve of an illuminator of an embodiment of the present invention and a corresponding image on a CCTV monitor showing a scene illuminated by the illuminator of an embodiment of the present invention.

As shown in FIG. 8(a), a beam pattern created by present embodiments creates a less intense central beam and instead distributes the intensity out to the outer limits of the scene, this being shown in FIG. 8(b) as a CCTV image of the scene illuminated by the beam pattern of FIG. 8(a).

Figure 9:
FIG. 9 shows a varifocal lens of a camera for use with embodiments of the present invention.

In simple terms the flexibility allows the light to match the angle of illumination to the angle of view from varifocal CCTV lens 900 as shown in FIG. 9.

The design of preferred embodiments will ensure that various angles of horizontal spread can be achieved from a single product.

The design of preferred embodiments enables the angle of illumination to be changed and matched to the changeable field of view of varifocal lenses The design of preferred embodiments will ensure that a more suitable horizontal illumination is provided over the chosen area The design of preferred embodiments will ensure that a more even illumination pattern and a more useable CCTV picture is provided.

An Adaptive Illumination (AI) Control System of present embodiments may be used with camera based vision systems for example, but not exclusively, Closed Circuit Television Systems, Machine Vision Systems, and Broadcast lighting systems.

Adaptive Illumination is primarily designed to provide vari-focal flexibility and help to provide correctly illuminated camera images In some embodiments, this is a mechanical control system to control the light output of illumination systems specifically designed for camera based vision systems.

Particularly preferred embodiments relate to LED based lighting systems for CCTV In summary the flexibility derived from vari-focal lens in CCTV and Photography terms can now be matched with flexibility in CCTV lighting.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A CCTV video camera adaptive illumination device comprising:
   first and second lighting units connected to each other by way of a hinge mechanism, which comprises a hinge; and
   a gear mechanism such that angular movement of the first lighting unit about the hinge causes equivalent angular movement of the second lighting unit in an opposite direction about the hinge;
   wherein the gear mechanism is provided with a servo motor such that the two units pivot about the hinge under electronic control; and
   wherein the electronic control is linked with a zoom control for a lens of an associated video camera, such that the two units pivot away from each other as the focal length of the lens is reduced (for wide-angle operation), or pivot towards each other as the focal length of the lens is increased (for telephoto operation).

2. A device as claimed in claim 1, wherein each lighting unit comprises a housing with a panel or matrix of light emitters provided on a frontal surface thereof.

3. A device as claimed in claim 2, wherein the light emitters are LEDs, and emit visible or infra-red or other light.

4. A device as claimed in claim 1, in combination with a camera.

* * * * *